United States Patent
Salesse-Lavergne et al.

(10) Patent No.: US 8,788,123 B2
(45) Date of Patent: Jul. 22, 2014

(54) METHOD OF ASSISTED PILOTING OF A ROTARY WING AIRCRAFT HAVING AT LEAST ONE PROPULSION PROPELLER, AN ASSISTED PILOTING DEVICE, AND AN AIRCRAFT

(71) Applicant: Eurocopter, Cedex (FR)

(72) Inventors: Marc Salesse-Lavergne, Marseilles (FR); Nicholas Queiras, Les Pennes Mirabeau (FR); Paul Eglin, Roquefort la Bedoule (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/676,299

(22) Filed: Nov. 14, 2012

(65) Prior Publication Data

US 2013/0131896 A1  May 23, 2013

(30) Foreign Application Priority Data

Nov. 23, 2011  (FR) ..................... 11 03561

(51) Int. Cl.
| G05D 1/00 | (2006.01) |
| G05D 1/08 | (2006.01) |
| G05D 3/00 | (2006.01) |
| G01C 23/00 | (2006.01) |
| B64C 27/00 | (2006.01) |
| B64C 27/04 | (2006.01) |
| B64C 27/12 | (2006.01) |
| B64C 17/00 | (2006.01) |

(52) U.S. Cl.
CPC ............. *G01C 23/00* (2013.01); *B64C 27/00* (2013.01); *B64C 27/04* (2013.01); *B64C 27/12* (2013.01); *B64C 17/00* (2013.01)
USPC ........... 701/4; 701/3; 701/11; 701/14; 244/6; 244/7 A; 244/17.11; 244/17.13; 244/92

(58) Field of Classification Search
CPC ... G01C 23/00; G05D 1/0061; G05D 1/0858; G05D 1/08; B64C 23/005; B64C 27/26; B64C 27/04; B64C 17/00; B64C 15/00; B64C 29/00
USPC ............... 701/3, 4, 11, 14; 244/6, 7 A, 17.11, 244/17.13, 92, 195
See application file for complete search history.

(56) References Cited

U.S. PATENT DOCUMENTS 4,807,129 A * 2/1989 Perks ............................. 701/3
5,096,140 A * 3/1992 Dornier et al. ............... 244/7 C (Continued)

OTHER PUBLICATIONS

Search Report and Written Opinion; Application No. FR 1103561; dated Aug. 8, 2012.

*Primary Examiner* — Thomas Tarcza
*Assistant Examiner* — Tyler J Lee
(74) *Attorney, Agent, or Firm* — Brooks Kushman P.C.

(57) ABSTRACT

A device (10) for assisted piloting of an aircraft having a rotary wing with a plurality of second blades (3') and a propulsion unit with a plurality of first blades (2'). The device includes control means (30, 40) for delivering a movement order (O) for moving in a direction, said device (10) having a processor unit (20) for transforming said order (O) into an acceleration setpoint (C) along said direction, and then for transforming said acceleration setpoint (C) into at least one required longitudinal attitude setpoint ($\theta^*$) that is transmitted to a first automatic system (26) for maintaining longitudinal attitude by controlling a longitudinal cyclic pitch of the second blades (3'), and into a first required load factor setpoint ($Nx^*$) in a longitudinal direction that is transmitted to a second automatic system (25) for maintaining load factor by controlling the collective pitch of the first blades.

18 Claims, 1 Drawing Sheet

(56) References Cited

U.S. PATENT DOCUMENTS

| | | | |
|---|---|---|---|
| 6,431,494 B1 * | 8/2002 | Kinkead et al. | 244/76 B |
| 6,592,071 B2 * | 7/2003 | Kinkead et al. | 244/7 R |
| 6,793,173 B2 * | 9/2004 | Salesse-Lavergne | 244/17.13 |
| 7,438,259 B1 * | 10/2008 | Piasecki et al. | 244/6 |
| 7,873,445 B2 * | 1/2011 | Schaeffer | 701/4 |
| 7,908,044 B2 * | 3/2011 | Piasecki et al. | 701/4 |
| 7,930,074 B2 * | 4/2011 | Cherepinsky et al. | 701/12 |
| 8,170,728 B2 * | 5/2012 | Roesch | 701/3 |
| 8,463,465 B2 * | 6/2013 | Piasecki et al. | 701/4 |
| 2007/0221780 A1 * | 9/2007 | Builta | 244/7 R |
| 2008/0237392 A1 | 10/2008 | Piasecki | |

* cited by examiner

METHOD OF ASSISTED PILOTING OF A ROTARY WING AIRCRAFT HAVING AT LEAST ONE PROPULSION PROPELLER, AN ASSISTED PILOTING DEVICE, AND AN AIRCRAFT

CROSS REFERENCE TO RELATED APPLICATIONS

This application claims priority to French patent application No. FR 11 03561 filed on Nov. 23, 2011, the disclosure of which is incorporated in its entirety by reference herein.

BACKGROUND OF THE INVENTION (1) Field of the Invention

The present invention relates to a method of assisted piloting for a rotary wing aircraft that has at least one propulsion propeller, and also to an assisted piloting device and to an aircraft.

(2) Description of Related Art

Aircraft include in particular rotorcraft, i.e. aircraft that have a rotary wing. Furthermore, certain rotorcraft are also provided with an additional propulsion unit.

A rotary wing aircraft having an additional propulsion unit, which propulsion unit has at least one propulsion propeller, is referred to for convenience below as a "hybrid aircraft".

Such a hybrid aircraft may comprise:

thrust control means for controlling the thrust generated by the propulsion unit;

collective control means for controlling the collective pitch of the blades of the rotary wing; and cyclic control means for controlling the cyclic pitch of the blades of the rotary wing.

Under such circumstances, it can be seen that the flight controls are redundant.

In order to control longitudinal acceleration of a hybrid aircraft, a pilot may use the thrust control means, and/or may act on the cyclic control means as in a conventional helicopter.

Likewise, in order to control vertical acceleration of a hybrid aircraft in order to control climbing or descent of the hybrid aircraft, a pilot can act, as in a conventional helicopter, on the collective control means without changing the attitude of the hybrid aircraft, and/or can, for example, both change the longitudinal attitude of the aircraft with the help of the cyclic control means and also make use of the thrust control means.

It can be understood that a multitude of control combinations can be envisaged for piloting a hybrid aircraft.

It can thus be useful to provide a method and a device for lightening the workload on the pilot by assisting the pilot when performing maneuvers by controlling the rotary wing and the propulsion unit.

It may be observed that the state of the art includes US patent document 2008/0237392 published on Oct. 2, 2008. That US patent document 2008/0237392 describes an aircraft having a rotary wing, a fixed wing, and a propulsion propeller.

A control system of the aircraft enables a person to select a control technique for achieving an operational objective.

More precisely, in its paragraphs 63 to 71, document US 2008/0237392 describes a vertical and longitudinal control module of the aircraft that receives input data relating to commands for changing a pitching angle and a vertical speed.

That input data is filtered and then subjected to processing before being transmitted to an inversion module, the inversion module determining the changes to be applied to the control means of the aircraft.

Furthermore, it should be observed that in paragraphs 72 to 75 of that document, a longitudinal acceleration order is processed by a limiter in order to transform it into a limited order (referred to as a "constrained acceleration") seeking to comply with the limits of the engines.

That limited order is integrated and then compared with the speed of the aircraft in order to generate an error signal. After processing, the error signal gives rise to a setpoint speed referred to as a "forward speed pseudo-control". The changes to the rotary wing in pitch, and the changes to the propellers are derived from that parameter.

It should also be observed that an acceleration and a load factor represent two concepts that are substantially different.

BRIEF SUMMARY OF THE INVENTION

An object of the present invention is thus to propose an alternative method of assisted piloting for a hybrid aircraft to lighten the workload of a pilot of the hybrid aircraft.

The invention provides a method of assisted piloting for an aircraft having a rotary wing and a propulsion unit including at least one propulsion propeller, each propeller having a plurality of first blades, and the rotary wing comprising at least one rotor provided with a plurality of second blades.

According to the method, the following steps are performed by translating an order given by the pilot of the aircraft to request a movement in a direction into an acceleration setpoint along that direction, and then transforming the acceleration setpoint by predetermined relationships into:

at least one required longitudinal attitude setpoint transmitted to a first automatic system for maintaining longitudinal attitude by controlling a longitudinal cyclic pitch of the second blades of the rotary wing in order to comply with said required longitudinal attitude setpoint that is transmitted; and into a first required load factor setpoint in a longitudinal direction of the aircraft parallel to a roll axis of the aircraft that is transmitted to a second automatic system for maintaining said load point by controlling a collective pitch of the first blades of the propulsion unit in order to comply with said first setpoint.

Under such circumstances, regulation loops make use of the required longitudinal attitude setpoint and of the first setpoint for controlling the aircraft.

It should be observed that the term "longitudinal attitude" is used to designate the pitching angle of the aircraft.

The pilot can thus be content with delivering an order requesting movement of the aircraft in a longitudinal direction or in a vertical direction, with the method enabling the aircraft to be controlled automatically accordingly.

This lightens the workload for the pilot.

It should be observed that the term "longitudinal direction" means a direction parallel to the longitudinal direction in which the aircraft extends and that can be considered as being the roll axis of the aircraft, while a "vertical direction" should be understood as a direction parallel to gravity.

The method may then include one or more of the following additional characteristics.

In a first implementation, when the order is an order to move in a longitudinal direction parallel to a roll axis of the aircraft, the order to move in a longitudinal direction is translated into a longitudinal acceleration setpoint, and then the longitudinal acceleration setpoint is transformed by predetermined relationships solely into a required longitudinal attitude setpoint transmitted to a first automatic system for maintaining longitudinal attitude and into a first required load factor setpoint by controlling a longitudinal cyclic pitch of the second blades, and into a first required load factor setpoint that is transmitted to a second automatic system for maintaining load factor by controlling a collective pitch of the first blades.

The required longitudinal attitude setpoint may be determined by the following first longitudinal control relationship:

$$\theta^* = (180/\text{Pi}) \times [(-a) \times (\gamma_x^*/g) - k]/(a+b)$$

where "$\theta$" represents the required longitudinal attitude setpoint expressed in degrees, "Pi" represents the number $\pi$, "$\gamma_x^*$" represents the longitudinal acceleration setpoint, "g" represents the acceleration due to gravity, "×" represents the multiplication sign, "/" represents the division sign, "a" represents a first longitudinal constant, "b" represents a second longitudinal constant, and "k" represents a third longitudinal constant.

Furthermore, the first required load factor setpoint may be determined by the following second longitudinal control relationship:

$$Nx^* = [b \times (\gamma_x^*/g) - k]/(a+b)$$

where "$Nx^*$" represents the first required load factor setpoint, "$\gamma_x^*$" represents the longitudinal acceleration setpoint, "g" represents the acceleration due to gravity, "×" represents the multiplication sign, "/" represents the division sign, "a" represents a first longitudinal constant, "b" represents a second longitudinal constant, and "k" represents a third longitudinal constant.

It should be observed that the first required longitudinal attitude setpoint may be modified by incrementation or decrementation performed by an attitude adjustment member, it being possible for the attitude adjustment member to be a pulse control member mounted on a cyclic control handle of the aircraft.

In a first variant of the first implementation, it is considered that the third longitudinal constant is equal to zero in order to reinitialize said first required load factor setpoint by resetting it to zero when the pilot does not give an order to move in a longitudinal direction, the longitudinal acceleration setpoint being zero.

In this configuration, while maneuvering to pull up the nose, for example, or while the attitude control member is changing longitudinal attitude references, the second automatic system for maintaining load factor acts on a control system for reducing the collective pitch of the first blades. The power consumed by the propellers then remains almost constant, while the longitudinal speed of the aircraft reduces as a result of the maneuver.

Still in this configuration, during a nose-down maneuver, the second automatic system for maintaining load factor acts on a control system to increase the collective pitch of the first blades. The power consumed by the blades then remains almost constant, while the longitudinal speed of the aircraft increases as a result of the maneuver.

This configuration thus presents the advantage of managing the power of the propellers during maneuvering stages.

In a second variation of the first implementation, when the pilot does not give a movement order for movement in the longitudinal direction, the pilot may decide to switch to a speed-maintaining mode in which the first load factor setpoint is equal to the sine of the current longitudinal attitude, with the longitudinal acceleration setpoint being zero.

Under such circumstances, when maneuvering to pull up the nose of the aircraft, the second automatic system for maintaining load factor acts on a control system so as to increase the collective pitch of the first blades so as to maintain the longitudinal speed of the aircraft almost constant.

Conversely, when performing a nose-down maneuver, when the pilot acts on the cyclic stick, the second automatic system for maintaining load factors acts on a control system to reduce the collective pitch of the first blades so as to oppose the increase in speed associated with the maneuver.

This second variant of the first implementation thus presents the advantage of managing the speed of the aircraft during those maneuvers. It may be used as an alternative to maintaining speed by acting on the collective pitch of the propellers of the propulsion unit.

In this same implementation, it is easy to add a second regulation loop on the collective pitch of the first blades making use of the indicated air speed (IAS) as its parameter in order to achieve greater robustness.

In a third variant, it is advantageous to use the third longitudinal constant as an "ideal" equilibrium attitude setpoint so as to facilitate piloting the aircraft. The manufacturer thus determines an equilibrium attitude "$\theta_{equi}$" that optimizes the performance of the aircraft during predetermined stabilized flight stages in which the longitudinal acceleration setpoint is zero.

In order to conserve the speed of the aircraft when returning to an equilibrium point, the third longitudinal constant "k" is then determined by the following formula:

$$k = -\sin(\theta_{equi}) \times (a+b)$$

where "×" represents the multiplication sign, "a" represents said first longitudinal constant, "b" represents said second longitudinal constant, and "$\theta_{equi}$" represents a predetermined equilibrium setpoint optimizing the performance of the aircraft in predetermined stabilized flight stages, the longitudinal acceleration setpoint $\gamma_x^*$ being zero.

Thus, in a stabilized stage, the equilibrium attitude is automatically managed and taken as a reference by the basic stabilization of the autopilot. During this particular stage, the first setpoint for maintaining load factor $Nx^*$ corresponds to the term "$\sin(\theta_{equi})$", thus making it possible to conserve the speed of the aircraft while returning to the equilibrium point.

It should be observed that the device performing the method may include selector means operable by the pilot in order to choose whether to apply the first variant, the second variant, or the third variant.

Optionally, the longitudinal constants are selected from a list including at least one of the following combinations:

a first longitudinal combination in which the first longitudinal setpoint is equal to "1", the second longitudinal constant is equal to zero, and the third longitudinal constant is equal to zero;

a second longitudinal combination in which the first longitudinal setpoint is equal to "0.001", the second longitudinal constant is equal to "1", and the third longitudinal constant is equal to zero; and a third longitudinal combination in which the first longitudinal setpoint is equal to "0.9", the second longitudinal constant is equal to "2", and the third longitudinal constant is equal to zero.

Advantageously, the first longitudinal combination is applied at a longitudinal speed that is low, i.e. slower than 70 knots (kts). In this first longitudinal combination, the aircraft is controlled mainly by modifying its longitudinal attitude.

The second longitudinal combination is optionally applied at a longitudinal speed that is high, i.e. faster than 150 kts. In this second longitudinal combination, the aircraft is controlled mainly by using the collective pitch of the first blades of the propellers in order to optimize the aerodynamic drag of the aircraft.

The third longitudinal combination is optionally applied at medium longitudinal speed, i.e. in the range 70 kts to 150 kts. In this third longitudinal combination, the aircraft is controlled both with the collective pitch of the first blades of the propellers and by modifying the longitudinal attitude of the aircraft.

In a second implementation compatible with the first implementation, when the order is an order to move in a vertical direction parallel to the gravity direction, this movement order is translated along an elevation direction into a vertical acceleration setpoint, and then this vertical acceleration setpoint is transformed by predetermined control relationships into a required longitudinal attitude setpoint that is transmitted to a first automatic system for maintaining longitudinal attitude, into a longitudinal first required load factor setpoint that is transmitted to a second automatic system for maintaining load factor by containing a collective pitch of the first blades, and into a vertical second required load factor setpoint that is transmitted to a third automatic system for maintaining load factor by controlling collective pitch variation of the second blades of the rotary wing.

During equilibrium stages, or for example after a vertical acceleration setpoint, this control architecture makes it possible to conserve both a longitudinal speed and a vertical speed that are constant. The climbing (or descending) stage then takes place while keeping the aircraft at a constant aerodynamic angle of incidence. If so desired, the pilot can continue to pilot the aircraft with a cyclic flight control for the second blades in order to change or adjust attitude, the control relationship continuing to keep the machine at the same longitudinal and vertical speeds.

The required longitudinal attitude setpoint may then be determined by the following first vertical control relationship:

$$\theta^* = \int q^* dt$$

with:

$$q^* = (g/u) \times [-a'' \times (Nz^* + \cos\theta \times \cos\phi) - k''] / (a'' + b'')$$

and:

$$Nz^* = (1/(a'\cos\theta \times \cos\phi + b'\times \sin\theta)) \times (-a'\times(\Gamma z^*/g + 1) - k'\times\sin\theta)$$

where "$\theta^*$" represents the required longitudinal attitude setpoint expressed in radians, "$\Gamma z^*$" represents the vertical acceleration setpoint requested by the pilot, "g" represents the acceleration due to gravity, "u" represents the current longitudinal speed of the aircraft expressed in meters per second (m/s), "$\theta$" represents the current longitudinal attitude expressed in radians, "$\phi$" represents the current roll angle of the aircraft expressed in radians, "×" represents the multiplication sign, "/" represents the division sign, "a'" represents a first vertical constant, "b'" represents a second vertical constant, "k'" represents a third vertical constant, "a''" represents a fourth vertical constant, "b''" represents a fifth vertical constant, and "k''" represents a sixth vertical constant, the required longitudinal attitude setpoint $\theta^*$ being frozen when the vertical acceleration setpoint is equal to 1.

In another aspect, the first required load factor setpoint may be determined by the following second vertical control relationship:

$$Nx^* = (1/(a'\times\cos\theta \times \cos\phi + b'\times\sin\theta)) \times (b'\times(\Gamma z^*/g + 1) - k'\times\cos\theta \times \cos\phi)$$

where "$Nx^*$" represents the first required load factor setpoint expressed as a number of "g", "$\Gamma z^*$" represents the vertical acceleration setpoint requested by the pilot, "g" represents the acceleration due to gravity, "×" represents the multiplication sign, "/" represents the division sign, "$\theta$" represents the current longitudinal attitude expressed in radians, "$\phi$" represents the current roll angle of the aircraft expressed in radians, "a'" represents a first vertical constant, "b'" represents a second vertical constant, "k'" represents a third vertical constant, in the absence of said order to move in a vertical direction, said first setpoint $Nx^*$ being equal to the sine of the current longitudinal attitude $\theta$.

Furthermore, the second required load factor setpoint may be determined by the following third vertical control relationship:

$$NZ\text{coll}^* = (b''\times(Nz^* + \cos\theta \times \cos\phi) - k'')/(a'' + b'')$$

and $$Nz^* = (1/(a'\times\cos\theta \times \cos\phi + b'\times\sin\theta)) \times (-a'\times(\Gamma z^*/g + 1) - k'\times\sin\theta)$$

where "NZcoll" represents the second required load factor setpoint expressed as a number of "g", "$\Gamma z^*$" represents the vertical acceleration setpoint, "g" represents the acceleration due to gravity, "$\theta$" represents the current longitudinal attitude expressed in radians, "$\phi$" represents the current roll angle of the aircraft expressed in radians, "×" represents the multiplication sign, "/" represents the division sign, "a'" represents a first vertical constant, "b'" represents a second vertical constant, "k'" represents a third vertical constant, "a''" represents a fourth vertical constant, "b''" represents a fifth vertical constant, and "k''" represents a sixth vertical constant.

Optionally, said vertical constants are selected from a list including at least one of the following combinations:

a first vertical combination in which the first vertical constant is equal to "1", the second vertical constant is equal to zero, the third vertical constant is equal to zero, the fourth vertical constant is equal to zero, the fifth vertical constant is equal to "1", and the sixth vertical constant is equal to zero;

a second vertical combination in which the first vertical constant is equal to "1", the second vertical constant is equal to zero, the third vertical constant is equal to zero, the fourth vertical constant is equal to "0.8", the fifth vertical constant is equal to "1", and the sixth vertical constant is equal to zero;

a third vertical combination in which the first vertical constant is equal to "1", the second vertical constant is equal to zero, the third vertical constant is equal to zero, the fourth vertical constant is equal to "−0.6", the fifth vertical constant is equal to "1", and the sixth vertical constant is equal to zero;

a fourth vertical combination in which the first vertical constant is equal to "1", the second vertical constant is equal to "0.15", the third vertical constant is equal to zero, the fourth vertical constant is equal to "0.8", the fifth vertical constant is equal to "1", and the sixth vertical constant is equal to zero;

a fifth vertical combination in which the first vertical constant is equal to "1", the second vertical constant is equal to "0.15", the third vertical constant is equal to zero, the fourth vertical constant is equal to "−0.6", the fifth vertical constant is equal to "1", and the sixth vertical constant is equal to zero;

a sixth vertical combination in which the first vertical constant is equal to "1", the second vertical constant is equal to "−0.15", the third vertical constant is equal to zero, the fourth vertical constant is equal to "0.8", the fifth vertical constant is equal to "1", and the sixth vertical constant is equal to zero; and a seventh vertical combination in which the first vertical constant is equal to "1", the second vertical constant is equal to "−0.15", the third vertical constant is equal to zero, the fourth vertical constant is equal to "−0.6", the fifth vertical constant is equal to "1", and the sixth vertical constant is equal to zero.

Thus, the first vertical combination makes it possible to control the aircraft by controlling the collective pitch of the second blades of the rotary wing, without changing the longitudinal attitude of the aircraft.

The second vertical combination enables the aircraft to be controlled by controlling the collective pitch of the second blades of the rotary wing, with a nose-up longitudinal attitude.

The third vertical combination enables the aircraft to be controlled by controlling the collective pitch of the second blades of the rotary wing, with a nose-down longitudinal attitude.

The fourth vertical combination enables the aircraft to be controlled by controlling the collective pitch of the first blades of the propellers in order to accelerate, with a nose-up longitudinal attitude.

The fifth vertical combination enables the aircraft to be controlled by controlling the collective pitch of the first blades of the propellers in order to accelerate, with a nose-down longitudinal attitude.

The sixth vertical combination enables the aircraft to be controlled by controlling the collective pitch of the first blades of the propellers in order to decelerate, with a nose-up longitudinal attitude.

The seventh vertical combination enables the aircraft to be controlled by controlling the collective pitch of the first blades of the propellers to decelerate, with a nose-down longitudinal attitude.

It can be understood that the values of the various constants may be adjusted without going beyond the ambit of the invention.

Selector means may be used to enable the pilot to choose a desired combination.

In a preferred embodiment, these various operating modes are selected automatically in order to adjust the constants used in said predetermined relationships as a function of flying circumstances. As main parameters defining flying circumstances, mention may be made of: the current horizontal speed; the current vertical speed; the current altitude; the current power; the available power; and the maximum acceptable attitude.

In addition to a method, the invention also provides a device for applying the method.

The invention thus provides a device for assisted piloting of an aircraft having a rotary wing and a propulsion unit having at least one propulsion propeller, each propeller having a plurality of first blades and the rotary wing having at least one rotor having a plurality of second blades.

The device includes at least one control means suitable for being controlled by a pilot to deliver a movement order for movement in a direction, said device having a processor unit connected to the control means, the processor unit executing instructions to transform said order into an acceleration setpoint in said direction, and then to transform said acceleration setpoint, by means of predetermined relationships, into at least one required longitudinal attitude setpoint that is transmitted to a first automatic system for maintaining longitudinal attitude by controlling a longitudinal cyclic pitch of the second blades of the rotary wing, and into a first required load factor setpoint in a longitudinal direction of the aircraft parallel to a roll axis of said aircraft that is transmitted to a second automatic system for maintaining load factor by controlling the collective pitch of the first blades of the propulsion unit.

Furthermore, the device may in particular include one or more of the following characteristics.

The device may thus include a third automatic system for maintaining load factor to control the collective pitch of said second blades, said processor unit transmitting a second required load factor setpoint to the third automatic means for maintaining load factor.

In addition, the device may include a system for determining flight parameters.

For example, such a system for determining flight parameters may be of the type known as air data attitude and heading reference system (ADAHRS).

By way of example, the system for determining flight parameters may determine the current flight parameters of the aircraft in real time, such as the current longitudinal speed, the current sideslip, the current vertical speed, the current longitudinal attitude, i.e. the pitching angle of the aircraft, the current transverse attitude, i.e. the roll angle of the aircraft, the current yaw angle, the current longitudinal load factor, the current sideslip load factor, and the current load factor in elevation.

The system for determining flight parameters may then provide the current values of flight parameters used in the predetermined relationship for transforming the established acceleration setpoint.

It should be observed that the system for determining flight parameters may also include means for determining other parameters, such as indicated air speed, altitude, consumed power, available power, in particular for adjusting the constants present in said predetermined relationships, e.g. in order to make it possible to elect a combination of constants automatically.

The device may also include selector means of the above-described type.

Finally, the invention also provides a hybrid aircraft having a rotary wing comprising at least one rotor and a propulsion unit comprising at least one propeller, the aircraft being provided with a device of the invention.

BRIEF DESCRIPTION OF THE SEVERAL VIEWS OF THE DRAWINGS

The invention and its advantages appear in greater detail from the context of the following description of implementations described by way of illustration, and with reference to the accompanying figures, in which.

Figures 1, 2:
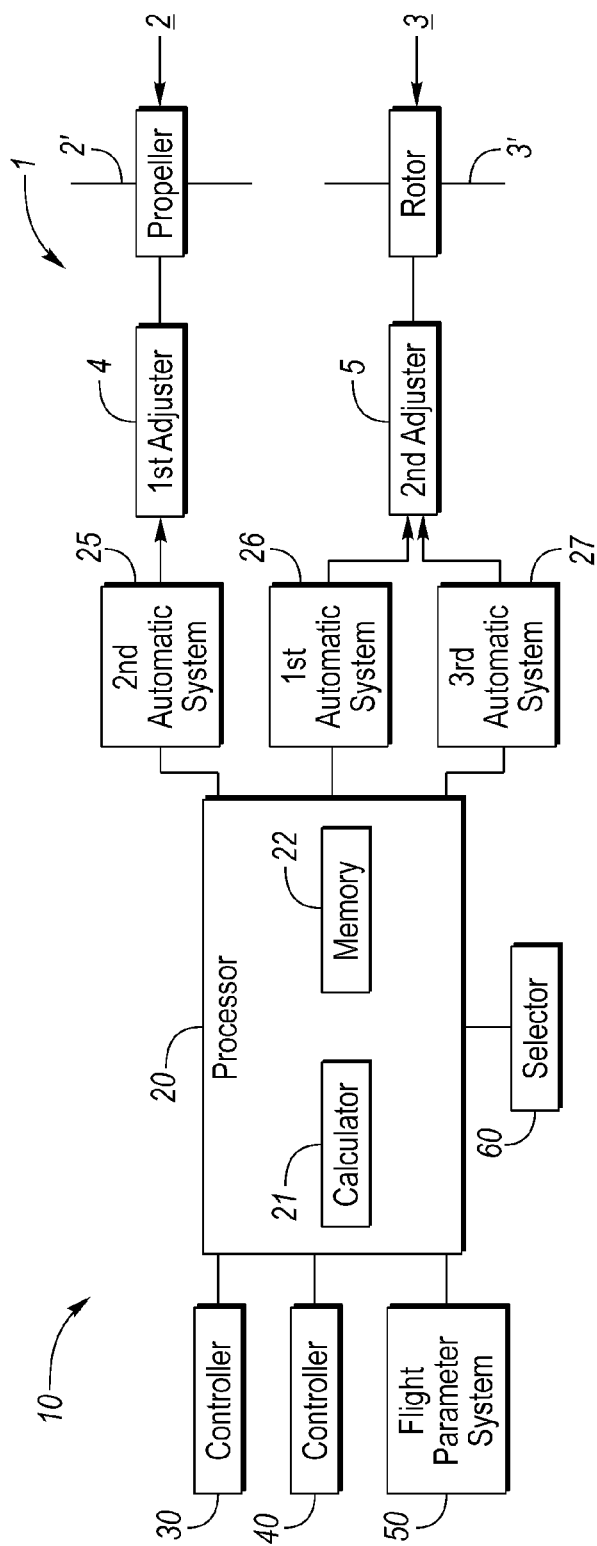
FIG. 1 is a diagram showing an aircraft of the invention.
FIG. 2 is a diagram explaining the method of the invention.

Elements that are present in more than one of the figures are given the same references in each of them.

DETAILED DESCRIPTION OF THE INVENTION

FIG. 1 shows a hybrid aircraft 1 in diagrammatic manner to avoid uselessly overloading FIG. 1.

The aircraft 1 comprises a propulsion unit having at least one propulsion propeller 2 with a plurality of first blades 2', and also a rotary wing having at least one rotor 3 with a plurality of second blades 3'.

The aircraft has first adjustment means 4 for controlling the pitch of the first blades 2, this first adjustment means 4 possibly being a hydraulic actuator suitable for modifying the collective pitch of the first blades.

Similarly, the aircraft has second adjustment means 5 for controlling the pitch of the second blades 3', the second adjustment means 5 possibly including at least three servo-controls for modifying both the collective pitch and the cyclic pitch of the second blades.

If the servo-controls extend or retract by the same amount, then the collective pitch of the second blades 3' is modified in identical manner. In contrast, if one of these servo-controls behaves differently from the others, then the cyclic pitch of the second blades 3' is modified accordingly. Reference can be made to the literature to obtain additional information about the collective pitch and the cyclic pitch of a rotor.

The aircraft 1 has a device 10 for assisted piloting in order to reduce the workload on a pilot.

The device 10 includes a processor unit 20 connected to at least one control means 30, 40, the pilot operating the control means in order to issue a movement order O for moving in a direction.

For example, the device has longitudinal control means 30 for issuing a movement order O for moving along a longitudinal direction of the aircraft, i.e. a direction parallel to the roll axis of the aircraft, and vertical control means 40 in order to issue a movement order O for moving along a vertical direction, i.e. parallel to the gravity direction.

Advantageously, the longitudinal control means are situated on the cyclic pitch control stick for the second blades, and the vertical control means are situated on the collective pitch control stick for the second blades.

The processor unit 20 may include a calculation member 21 and a memory 22, the calculation member executing instructions stored in the memory 22 in order to apply the method of the invention so as to deliver instructions to a first automatic system 26 for maintaining longitudinal attitude that is connected to the second adjustment means 5 in order to control the longitudinal cyclic pitch of the second blades 3', to a second automatic system 25 for maintaining load factor that is connected to the first adjustment means 4 for controlling the collective pitch of the first blades 2', and to a third automatic system 27 for maintaining load factor that is connected to the second adjustment means 5 for controlling the collective pitch of the second blades 3'. The control unit 20 may also be connected to a system 50 for determining flight parameters, e.g. of the type known under the acronym ADAHRS, and to selector means 60.

FIG. 2 explains the method of the invention as performed by the device 10.

In the method, during a first step P1, a movement order O for moving along a particular direction is translated into an acceleration setpoint C along that particular direction.

By way of example, the control means may be of the pulse type having three states: −; 0; and +; seeking to reduce or to increase a parameter.

Specifically, when a pilot operates a control means, the processors unit deduces therefrom that the pilot is requesting an increase or a decrease in the acceleration of the aircraft in the direction associated with the control means, and consequently deduces an acceleration setpoint C therefrom.

By way of example, the processor unit 20 integrates the signal coming from the control means in order to deduce the acceleration setpoint C therefrom.

Under such circumstances, during a second step P2, the processor unit then transforms the acceleration setpoint C by predetermined relationships into at least one required longitudinal attitude setpoint θ* transmitted to a first automatic system 26 for maintaining longitudinal attitude by controlling the longitudinal pitch of the rotary wing in order to comply with said required longitudinal attitude setpoint and into a first required load factor setpoint Nx* in a longitudinal direction of the aircraft parallel to a roll axis of said aircraft that is transmitted to a second automatic system 25 for maintaining said load point by controlling the collective pitch of the first blades 2' of the propulsion unit in order to comply with said first setpoint Nx*.

In a first implementation, the pilot operates the first longitudinal control means 30 to issue a movement order O for moving along a longitudinal direction of the aircraft.

The processor unit 20 turns the movement order O for moving in a longitudinal direction into a longitudinal acceleration setpoint $\gamma_x^*$ using the following relationship:

$$\gamma_x^* = \frac{1}{g}\int O \cdot dt$$

that is reset to zero in the absence of an order O and then peak-limited in amplitude and rate of variation, and in which g represents the acceleration due to gravity.

The processor unit 20 then transforms this longitudinal acceleration setpoint $\gamma_x^*$ using predetermined relationships into a required longitudinal attitude setpoint θ* that is transmitted to the first automatic system 26 for maintaining longitudinal attitude, and into a first required load factor setpoint Nx* that is transmitted to the second automatic system 25 for maintaining load factor by controlling a collective pitch of the first blades by proportional integral derivatives (PID) type regulation.

This required longitudinal attitude setpoint θ* may be determined by the following first longitudinal control relationship:

$$\theta^* = (180/\text{Pi}) \times [(-a) \times (\gamma_x^*/g) - k]/(a+b)$$

where "θ*" represents the required longitudinal attitude setpoint expressed in degrees, "Pi" represents the number π, "$\gamma_x^*$" represents the longitudinal acceleration setpoint, "g" represents the acceleration due to gravity, "×" represents the multiplication sign, "/" represents the division sign, "a" represents a first longitudinal constant, "b" represents a second longitudinal constant, and "k" represents a third longitudinal constant.

It can be understood that "θ*" is expressed in degrees. For a representation of this required longitudinal attitude setpoint in radians, the term 180/Pi should be eliminated.

Furthermore, the first required load factor setpoint Nx* may be determined by the following second longitudinal control relationship:

$$Nx^* = [b \times (\gamma_x^*/g) - k]/(a+b)$$

where "Nx*" represents said first required load factor setpoint, "$\gamma_x^*$" represents the longitudinal acceleration setpoint, "g" represents the acceleration due to gravity, "×" represents the multiplication sign, "/" represents the division sign, "a" represents a first longitudinal constant, "b" represents a second longitudinal constant, and "k" represents a third longitudinal constant.

It should be observed that the required longitudinal attitude setpoint θ* may be modified by incrementing or decrementing with the help of an attitude adjustment member when the acceleration setpoint is zero.

For example, a first control means referred to as a "longitudinal acceleration beep" for convenience serves to determine the longitudinal acceleration setpoint.

Under such circumstances, a control member referred to as the "attitude reference beep" for convenience may be used to modify solely the required longitudinal attitude setpoint θ* that is to be maintained by the first automatic system when the acceleration setpoint is zero.

In a first variant, the third longitudinal constant k is equal to zero for resetting to zero the first required load factor setpoint Nx* when the pilot does not give an order to move in the longitudinal direction, the longitudinal acceleration setpoint being zero.

In a second variant, when the pilot does not give an order to move in the longitudinal direction, the first load factor setpoint Nx* is equal to the sine of the current longitudinal attitude θ, the longitudinal acceleration setpoint $9\gamma_x^*$ being zero. In this implementation, it is easy to add a second regulation loop on the collective pitch of the first blades using the indicated air speed (IAS) as the parameter, thereby achieving greater robustness.

In a third variant, it is advantageous to use the third longitudinal constant "k" as an "ideal" equilibrium attitude setpoint in order to make the aircraft easier to pilot.

An equilibrium attitude $\theta_{equi}$ is estimated that depends on the main flight conditions, this equilibrium attitude $\theta_{equi}$ optimizing the performance of the aircraft during stabilized flight stages, i.e. when the longitudinal acceleration setpoint is zero.

Thus, the equilibrium attitude $\theta_{equi}$ is estimated as a function of flight conditions, e.g. as estimated with the help of the indicated air speed (IAS), of the altitude of the aircraft, of the power being consumed by the aircraft, of the power available from the power plant of the aircraft, and of the vertical speed of the aircraft.

The third longitudinal constant "k" is then determined with the help of the following formula:

$$k = -\sin(\theta_{equi}) \times (a+b)$$

Thus, in stabilized flight the equilibrium attitude is automatically managed and used as a reference by the basic stabilization of the autopilot. In this same stage, the required load factor setpoint Nx* corresponds to "$\sin(\theta_{equi})$", thus enabling the speed of the aircraft to be conserved on returning to the equilibrium point.

Furthermore, the longitudinal constants a, b, and k are selected from a list including at least one of the following combinations:

a first longitudinal combination in which the first longitudinal setpoint is equal to "1", the second longitudinal constant is equal to zero, and the third longitudinal constant is equal to zero;

a second longitudinal combination in which the first longitudinal setpoint is equal to "0.001", the second longitudinal constant is equal to "1", and the third longitudinal constant is equal to zero;

a third longitudinal combination in which the first longitudinal setpoint is equal to "0.9", the second longitudinal constant is equal to "2", and the third longitudinal constant is equal to zero.

In a second implementation compatible with the first implementation, the pilot operates the second control means 40 referred to for convenience as the "vertical acceleration beep" in order to issue an order O, the order O being an order to move in a vertical direction parallel to the gravity direction.

In one version, a pilot may optionally select a longitudinal combination by operating a selection button. Alternatively, the processor unit may determine the longitudinal combination to be applied as a function of the longitudinal speed of the aircraft, as determined using the system 50.

The processor unit 20 translates this movement order O for moving in an elevation direction in a vertical acceleration setpoint Γz* using the following relationship:

$$\Gamma z^* = \frac{1}{g} \int O \cdot dt$$

reset to zero in the absence of a pilot order and then peak-limited in amplitude and rate of variation, and where g represents the acceleration due to gravity.

The processor unit 20 then transforms this vertical acceleration setpoint Γz* into a required longitudinal attitude setpoint θ* that is transmitted to the first automatic system 26 for maintaining longitudinal attitude, into a first load factor setpoint Nx* that is transmitted to a second automatic system 25 for maintaining the load factor by controlling a collective pitch of the first blades by proportional integral derivative regulation, and into a second load factor setpoint NZcoll* that is transmitted to a third automatic system 27 for maintaining load factor by controlling variation of the collective pitch of the second blades of the rotary wing by proportional integral derivative regulation.

It should be observed that the first automatic system 26 for maintaining longitudinal attitude, the second automatic system 25 for maintaining load factor, and the third automatic system 27 for maintaining load factor may all form portions of a single piece of equipment.

It should also be observed that the required longitudinal attitude setpoint is optionally determined by the following first vertical control relationship:

$$\theta^* = \int q^* dt$$

with:

$$q^* = (g/u) \times [-a'' \times (Nz^* + \cos\theta \cos\phi) - k''] / (a'' + b'')$$

and:

$$Nz^* = (1/(a'\times\cos\theta^*\cos\phi + b'\times\sin\theta)) \times (-a'\times(\Gamma z^*/g+1) - k'\times\sin\theta)$$

where "θ*" represents the required longitudinal attitude setpoint expressed in radians, "Γz*" represents the vertical acceleration setpoint, "g" represents the acceleration due to gravity, "u" represents the current longitudinal speed of the aircraft as determined by the system 50, "θ" represents the current longitudinal attitude as determined by the system 50, "φ" represents the current roll angle of the aircraft as determined by the system 50, "×" represents the multiplication sign, "/" represents the division sign, "a'" represents a first vertical constant, "b'" represents a second vertical constant, "k'" represents a third vertical constant, "a''" represents a fourth vertical constant, "b''" represents a fifth vertical constant, and "k''" represents a sixth vertical constant, the required longitudinal attitude setpoint θ* being frozen, and thus kept constant, when the vertical acceleration setpoint is equal to 1.

Furthermore, the first load factor setpoint may be determined by the following second vertical control relationship:

$$Nx^* = (1/(a'\times\cos\theta\times\cos\phi + b'\times\sin\theta)) \times (b'\times(\Gamma z^*/g+1) - k'\times\cos\theta\times\cos\phi)$$

where "Nx*" represents the first required load factor setpoint, "Γz*" represents the vertical acceleration setpoint, "g" represents the acceleration due to gravity, "×" represents the multiplication sign, "/" represents the division sign, "θ" represents the current longitudinal attitude, "φ" represents the current roll angle of the aircraft, "a'" represents a first vertical constant, "b'" represents a second vertical constant, "k'" represents a third vertical constant, "a''" represents a fourth vertical constant, "b''" represents a fifth vertical constant, "k''"

represents a sixth vertical constant, in the absence of said order to move in a vertical direction, said first setpoint Nx* being equal to the sine of the current longitudinal attitude.

Finally, the second load factor setpoint is optionally determined by the following third vertical control relationship:

$$NZcoll^* = (b'' \times (Nz^* + \cos\theta \times \cos\phi) - k'')/(a'' + b'')$$

and $$Nz^* = (1/(a'\times\cos\theta\times\cos\phi + b'\times\sin\theta))\times(-a'\times(\Gamma z^*/g + 1) - k'\times\sin\theta)$$

where "NZcoll" represents the second required load factor setpoint, "Γz*" represents the vertical acceleration setpoint, "g" represents the acceleration due to gravity, "θ" represents the current longitudinal attitude, "φ" represents the current roll angle of the aircraft, "×" represents the multiplication sign, "/" represents the division sign, "a'" represents a first vertical constant, "b'" represents a second vertical constant, "k'" represents a third vertical constant, "a''" represents a fourth vertical constant, "b''" represents a fifth vertical constant, and "k''" represents a sixth vertical constant.

In addition, the vertical constants may be selected from a list including at least one of the following combinations:

a first vertical combination in which the first vertical constant is equal to "1", the second vertical constant is equal to zero, the third vertical constant is equal to zero, the fourth vertical constant is equal to zero, the fifth vertical constant is equal to "1", and the sixth vertical constant is equal to zero;

a second vertical combination in which the first vertical constant is equal to "1", the second vertical constant is equal to zero, the third vertical constant is equal to zero, the fourth vertical constant is equal to "0.8", the fifth vertical constant is equal to "1", and the sixth vertical constant is equal to zero;

a third vertical combination in which the first vertical constant is equal to "1", the second vertical constant is equal to zero, the third vertical constant is equal to zero, the fourth vertical constant is equal to "−0.6", the fifth vertical constant is equal to "1", and the sixth vertical constant is equal to zero;

a fourth vertical combination in which the first vertical constant is equal to "1", the second vertical constant is equal to "0.15", the third vertical constant is equal to zero, the fourth vertical constant is equal to "0.8", the fifth vertical constant is equal to "1", and the sixth vertical constant is equal to zero;

a fifth vertical combination in which the first vertical constant is equal to "1", the second vertical constant is equal to "0.15", the third vertical constant is equal to zero, the fourth vertical constant is equal to "−0.6", the fifth vertical constant is equal to "1", and the sixth vertical constant is equal to zero;

a sixth vertical combination in which the first vertical constant is equal to "1", the second vertical constant is equal to "−0.15", the third vertical constant is equal to zero, the fourth vertical constant is equal to "0.8", the fifth vertical constant is equal to "1", and the sixth vertical constant is equal to zero; and a seventh vertical combination in which the first vertical constant is equal to "1", the second vertical constant is equal to "−0.15", the third vertical constant is equal to zero, the fourth vertical constant is equal to "−0.6", the fifth vertical constant is equal to "1", and the sixth vertical constant is equal to zero.

A pilot may optionally select a vertical combination by operating selector means 60.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. A method of assisted piloting for an aircraft having a rotary wing and a propulsion unit including at least one propulsion propeller, each propeller having a plurality of first blades, and the rotary wing including a rotor provided with a plurality of second blades, the method comprising:

translating an order given to an aircraft controller by a pilot of the aircraft to request a movement in a direction into an acceleration setpoint along said direction;

transforming, by a processor in communication with the aircraft controller, the acceleration setpoint by predetermined relationships into a required longitudinal attitude setpoint (θ*) and into a first required load factor setpoint (Nx*) in a longitudinal direction of the aircraft parallel to a roll axis of said aircraft;

transmitting the required longitudinal attitude setpoint (θ*) to a first automatic system for maintaining longitudinal attitude by controlling a longitudinal cyclic pitch of the second blades of the rotary wing in order to comply with said required longitudinal attitude setpoint (θ*); and transmitting the first required load factor setpoint (Nx*) to a second automatic system for maintaining load factor by controlling a collective pitch of the first blades of the propulsion unit in order to comply with said first load factor setpoint (Nx*).

2. The method according to claim 1, wherein when said order is an order to move in a longitudinal direction of the aircraft parallel to a roll axis of said aircraft, said order to move in a longitudinal direction is translated into a longitudinal acceleration setpoint, and then the longitudinal acceleration setpoint is transformed by predetermined relationships solely into the required longitudinal attitude setpoint (θ*) transmitted to the first automatic system for maintaining longitudinal attitude and into the first required load factor setpoint (Nx*) transmitted to the second automatic system for maintaining load factor.

3. A method of assisted piloting for an aircraft having a rotary wing and a propulsion unit including at least one propulsion propeller, each propeller having a plurality of first blades, and the rotary wing including a rotor provided with a plurality of second blades, the method comprising:

translating an order to an aircraft controller given by a pilot of the aircraft to request a movement in a direction into an acceleration setpoint along said direction;

transforming, by a processor in communication with the aircraft controller, the acceleration setpoint by predetermined relationships into a required longitudinal attitude setpoint (θ*) and into a first required load factor setpoint (Nx*) in a longitudinal direction of the aircraft parallel to a roll axis of said aircraft;

transmitting the required longitudinal attitude setpoint (θ*) to a first automatic system for maintaining longitudinal attitude by controlling a longitudinal cyclic pitch of the second blades of the rotary wing in order to comply with said required longitudinal attitude setpoint (θ*); and transmitting the first required load factor setpoint (Nx*) to a second automatic system for maintaining load factor by controlling a collective pitch of the first blades of the propulsion unit in order to comply with said first load factor setpoint (Nx*);

wherein when said order is an order to move in a longitudinal direction of the aircraft parallel to a roll axis of said aircraft, said order to move in a longitudinal direction is translated into a longitudinal acceleration setpoint, and then the longitudinal acceleration setpoint is transformed by predetermined relationships solely into the required longitudinal attitude setpoint (θ*) transmitted to the first automatic system for maintaining longitudinal attitude and into the first required load factor setpoint (Nx*) transmitted to the second automatic system for maintaining load factor;

wherein said required longitudinal attitude setpoint (θ*) is determined by the following first longitudinal control relationship:

$$\theta^* = (180/\text{Pi}) \times [(-a) \times (\gamma_x^*/g) - k]/(a+b)$$

where "θ*" represents the required longitudinal attitude setpoint expressed in degrees, "Pi" represents the number π, "$\gamma_x^*$" represents the longitudinal acceleration setpoint, "g" represents the acceleration due to gravity, "×" represents the multiplication sign, "/" represents the division sign, "a" represents a first longitudinal constant, "b" represents a second longitudinal constant, and "k" represents a third longitudinal constant.

4. A method of assisted piloting for an aircraft having a rotary wing and a propulsion unit including at least one propulsion propeller, each propeller having a plurality of first blades, and the rotary wing including a rotor provided with a plurality of second blades, the method comprising:
translating an order given to an aircraft controller by a pilot of the aircraft to request a movement in a direction into an acceleration setpoint along said direction;
transforming, by a processor in communication with the aircraft controller, the acceleration setpoint by predetermined relationships into a required longitudinal attitude setpoint (θ*) and into a first required load factor setpoint (Nx*) in a longitudinal direction of the aircraft parallel to a roll axis of said aircraft;
transmitting the required longitudinal attitude setpoint (θ*) to a first automatic system for maintaining longitudinal attitude by controlling a longitudinal cyclic pitch of the second blades of the rotary wing in order to comply with said required longitudinal attitude setpoint (θ*); and
transmitting the first required load factor setpoint (Nx*) to a second automatic system for maintaining load factor by controlling a collective pitch of the first blades of the propulsion unit in order to comply with said load factor setpoint (Nx*);
wherein when said order is an order to move in a longitudinal direction of the aircraft parallel to a roll axis of said aircraft, said order to move in a longitudinal direction is translated into a longitudinal acceleration setpoint, and then the longitudinal acceleration setpoint is transformed by predetermined relationships solely into the required longitudinal attitude setpoint (θ*) transmitted to the first automatic system for maintaining longitudinal attitude and into the first required load factor setpoint (Nx*) transmitted to the second automatic system for maintaining load factor;
wherein said first required load factor setpoint (Nx*) is determined by the following second longitudinal control relationship:

$$Nx^* = [b \times (\gamma_x^*/g) - k]/(a+b)$$

where "Nx*" represents said first required load factor setpoint, "$\gamma_x^*$" represents the longitudinal acceleration setpoint, "g" represents the acceleration due to gravity, "×" represents the multiplication sign, "/" represents the division sign, "a" represents a first longitudinal constant, "b" represents a second longitudinal constant, and "k" represents a third longitudinal constant.

5. The method according to claim 1, wherein the required longitudinal attitude setpoint (θ*) is modified by incrementing or decrementing by means of an attitude adjustment member when the acceleration setpoint is zero.

6. The method according to claim 3, wherein the third longitudinal constant (k) is equal to zero in order to reset to zero said first required load factor setpoint (Nx*) when the pilot does not give an order to move in said longitudinal direction, said longitudinal acceleration setpoint being zero.

7. The method according to claim 3, wherein the third longitudinal constant "k" is determined by the following formula:

$$k = -\sin(\theta_{equi}) \times (a+b)$$

where "×" represents the multiplication sign, "a" represents said first longitudinal constant, "b" represents said second longitudinal constant, and "$\theta_{equi}$" represents a predetermined equilibrium setpoint optimizing the performance of the aircraft in predetermined stabilized flight stages, the longitudinal acceleration setpoint ($\gamma_x^*$) being zero.

8. The method according to claim 2, wherein when the pilot does not give an order to move in the longitudinal direction, the first load factor setpoint (Nx*) is equal to the sine of the current longitudinal attitude (θ), the longitudinal acceleration setpoint ($\gamma_x^*$) being zero.

9. The method according to claim 3, wherein said longitudinal constants (a, b, k) are selected from a list including at least one of the following combinations:
a first longitudinal combination in which the first longitudinal setpoint is equal to "1", the second longitudinal constant is equal to zero, and the third longitudinal constant is equal to zero;
a second longitudinal combination in which the first longitudinal setpoint is equal to "0.001", the second longitudinal constant is equal to "1", and the third longitudinal constant is equal to zero; and
a third longitudinal combination in which the first longitudinal setpoint is equal to "0.9", the second longitudinal constant is equal to "2", and the third longitudinal constant is equal to zero.

10. The method according to claim 1, wherein, when said order (O) is an order to move in a vertical direction parallel to the gravity direction, this movement order is translated along an elevation direction into a vertical acceleration setpoint, and then this vertical acceleration setpoint is transformed into the required longitudinal attitude setpoint (θ*) that is transmitted to the first automatic system for maintaining longitudinal attitude, into the first load factor setpoint (Nx*) that is transmitted to the second automatic system for maintaining load factor, and into a second load factor setpoint (NZcoll*) that is transmitted to a third automatic system for maintaining load factor by controlling collective pitch variation of the second blades of the rotary wing.

11. A method of assisted piloting for an aircraft having a rotary wing and a propulsion unit including at least one propulsion propeller, each propeller having a plurality of first blades, and the rotary wing including a rotor provided with a plurality of second blades, the method comprising:
translating an order given to an aircraft controller by a pilot of the aircraft to request a movement in a direction into an acceleration setpoint along said direction;
transforming, by a processor in communication with the aircraft controller, the acceleration setpoint by predetermined relationships into a required longitudinal attitude setpoint (θ*) and into a first required load factor setpoint (Nx*) in a longitudinal direction of the aircraft parallel to a roll axis of said aircraft;

transmitting the required longitudinal attitude setpoint ($\theta^*$) to a first automatic system for maintaining longitudinal attitude by controlling a longitudinal cyclic pitch of the second blades of the rotary wing in order to comply with said required longitudinal attitude setpoint ($\theta^*$); and transmitting the first required load factor setpoint ($Nx^*$) to a second automatic system for maintaining load factor by controlling a collective pitch of the first blades of the propulsion unit in order to comply with said first load factor setpoint ($Nx^*$);

wherein, when said order (O) is an order to move in a vertical direction parallel to the gravity direction, this movement order is translated along an elevation direction into a vertical acceleration setpoint, and then this vertical acceleration setpoint is transformed into the required longitudinal attitude setpoint ($\theta^*$) that is transmitted to the first automatic system for maintaining longitudinal attitude, into the first load factor setpoint ($Nx^*$) that is transmitted to the second automatic system for maintaining load factor, and into a second load factor setpoint ($NZcoll^*$) that is transmitted to a third automatic system for maintaining load factor by controlling collective pitch variation of the second blades of the rotary wing;

wherein said required longitudinal attitude setpoint is determined by the following first vertical control relationship:

$$\theta^* = \int q^* dt$$

with:

$$q^* = (g/u) \times [-a'' \times (Nz^* + \cos\theta \times \cos\phi) - k'']/(a''+b'')$$

and:

$$Nz^* = (1/(a'\times\cos\theta\times\cos\phi + b'\times\sin\theta)) \times (-a'\times(\Gamma z^*/g+1) - k'\times\sin\theta)$$

where "$\theta^*$" represents the required longitudinal attitude setpoint expressed in radians, "$\Gamma z^*$" represents the vertical acceleration setpoint, "g" represents the acceleration due to gravity, "u" represents the current longitudinal speed of the aircraft, "$\theta$" represents the current longitudinal attitude, "$\phi$" represents the current roll angle of the aircraft, "×" represents the multiplication sign, "/" represents the division sign, "a'" represents a first vertical constant, "b'" represents a second vertical constant, "k'" represents a third vertical constant, "a''" represents a fourth vertical constant, "b''" represents a fifth vertical constant, and "k''" represents a sixth vertical constant, the required longitudinal attitude setpoint $\theta^*$ being frozen when the vertical acceleration setpoint is equal to 1.

12. A method of assisted piloting for an aircraft having a rotary wing and a propulsion unit including at least one propulsion propeller, each propeller having a plurality of first blades, and the rotary wing including a rotor provided with a plurality of second blades, the method comprising:

translating an order given to an aircraft controller by a pilot of the aircraft to request a movement in a direction into an acceleration setpoint along said direction;

transforming, by a processor in communication with the aircraft controller, the acceleration setpoint by predetermined relationships into a required longitudinal attitude setpoint ($\theta^*$) and into a first required load factor setpoint ($Nx^*$) in a longitudinal direction of the aircraft parallel to a roll axis of said aircraft;

transmitting the required longitudinal attitude setpoint ($\theta^*$) to a first automatic system for maintaining longitudinal attitude by controlling a longitudinal cyclic pitch of the second blades of the rotary wing in order to comply with said required longitudinal attitude setpoint ($\theta^*$); and transmitting the first required load factor setpoint ($Nx^*$) to a second automatic system for maintaining load factor by controlling a collective pitch of the first blades of the propulsion unit in order to comply with said first load factor setpoint ($Nx^*$);

wherein, when said order (O) is an order to move in a vertical direction parallel to the gravity direction, this movement order is translated along an elevation direction into a vertical acceleration setpoint, and then this vertical acceleration setpoint is transformed into the required longitudinal attitude setpoint ($\theta^*$) that is transmitted to the first automatic system for maintaining longitudinal attitude, into the first load factor setpoint ($Nx^*$) that is transmitted to the second automatic system for maintaining load factor, and into a second load factor setpoint ($NZcoll^*$) that is transmitted to a third automatic system for maintaining load factor by controlling collective pitch variation of the second blades of the rotary wing;

wherein said first load factor setpoint ($Nx^*$) is determined by the following second vertical control relationship:

$$Nx^* = (1/(a'\times\cos\theta\times\cos\phi + b'\times\sin\theta)) \times (b'\times(\Gamma z^*/g+1) - k'\times\cos\theta\times\cos\phi)$$

where "$Nx^*$" represents the first required load factor setpoint, "$\Gamma z^*$" represents the vertical acceleration setpoint, "g" represents the acceleration due to gravity, "×" represents the multiplication sign, "/" represents the division sign, "$\theta$" represents the current longitudinal attitude, "$\phi$" represents the current roll angle of the aircraft, "a'" represents a first vertical constant, "b'" represents a second vertical constant, "k'" represents a third vertical constant, in the absence of said order to move in a vertical direction, said first setpoint $Nx^*$ being equal to the sine of the current longitudinal attitude ($\theta$).

13. A method of assisted piloting for an aircraft having a rotary wing and a propulsion unit including at least one propulsion propeller, each propeller having a plurality of first blades, and the rotary wing including a rotor provided with a plurality of second blades, the method comprising:

translating an order given to an aircraft controller by a pilot of the aircraft to request a movement in a direction into an acceleration setpoint along said direction;

transforming, by a processor in communication with the aircraft controller, the acceleration setpoint by predetermined relationships into a required longitudinal attitude setpoint ($\theta^*$) and into a first required load factor setpoint ($Nx^*$) in a longitudinal direction of the aircraft parallel to a roll axis of said aircraft;

transmitting the required longitudinal attitude setpoint ($\theta^*$) to a first automatic system for maintaining longitudinal attitude by controlling a longitudinal cyclic pitch of the second blades of the rotary wing in order to comply with said required longitudinal attitude setpoint ($\theta^*$); and transmitting the first required load factor setpoint ($Nx^*$) to a second automatic system for maintaining load factor by controlling a collective pitch of the first blades of the propulsion unit in order to comply with said first load factor setpoint ($Nx^*$);

wherein, when said order (O) is an order to move in a vertical direction parallel to the gravity direction, this movement order is translated along an elevation direction into a vertical acceleration setpoint, and then this vertical acceleration setpoint is transformed into the required longitudinal attitude setpoint ($\theta^*$) that is transmitted to the first automatic system for maintaining longitudinal attitude, into the first load factor setpoint (Nx*) that is transmitted to the second automatic system for maintaining load factor, and into a second load factor setpoint (NZcoll*) that is transmitted to a third automatic system for maintaining load factor by controlling collective pitch variation of the second blades of the rotary wing;

wherein said second load factor setpoint (NZcoll*) is determined by the following third vertical control relationship:

$NZcoll* = (b'' \times (Nz* + \cos\theta \times \cos\phi) - k'')/(a'' + b'')$ and $Nz* = 1/(a'\times\cos\theta\times\cos\phi + b'\times\sin\theta)) \times (-a'\times(\Gamma z*/g+1) - k'\times\sin\theta)$ where "NZcoll" represents the second required load factor setpoint, "Γz*" represents the vertical acceleration setpoint, "g" represents the acceleration due to gravity, "θ" represents the current longitudinal attitude, "φ" represents the current roll angle of the aircraft, "×" represents the multiplication sign, "/" represents the division sign, "a'" represents a first vertical constant, "b'" represents a second vertical constant, "k'" represents a third vertical constant, "a''" represents a fourth vertical constant, "b''" represents a fifth vertical constant, and "k''" represents a sixth vertical constant.

14. The method according to claim 11, wherein said vertical constants are selected from a list including at least one of the following combinations:

a first vertical combination in which the first vertical constant is equal to "1", the second vertical constant is equal to zero, the third vertical constant is equal to zero, the fourth vertical constant is equal to zero, the fifth vertical constant is equal to "1", and the sixth vertical constant is equal to zero;

a second vertical combination in which the first vertical constant is equal to "1", the second vertical constant is equal to zero, the third vertical constant is equal to zero, the fourth vertical constant is equal to "0.8", the fifth vertical constant is equal to "1", and the sixth vertical constant is equal to zero;

a third vertical combination in which the first vertical constant is equal to "1", the second vertical constant is equal to zero, the third vertical constant is equal to zero, the fourth vertical constant is equal to "−0.6", the fifth vertical constant is equal to "1", and the sixth vertical constant is equal to zero;

a fourth vertical combination in which the first vertical constant is equal to "1", the second vertical constant is equal to "0.15", the third vertical constant is equal to zero, the fourth vertical constant is equal to "0.8", the fifth vertical constant is equal to "1", and the sixth vertical constant is equal to zero;

a fifth vertical combination in which the first vertical constant is equal to "1", the second vertical constant is equal to "0.15", the third vertical constant is equal to zero, the fourth vertical constant is equal to "−0.6", the fifth vertical constant is equal to "1", and the sixth vertical constant is equal to zero;

a sixth vertical combination in which the first vertical constant is equal to "1", the second vertical constant is equal to "−0.15", the third vertical constant is equal to zero, the fourth vertical constant is equal to "0.8", the fifth vertical constant is equal to "1", and the sixth vertical constant is equal to zero; and a seventh vertical combination in which the first vertical constant is equal to "1", the second vertical constant is equal to "−0.15", the third vertical constant is equal to zero, the fourth vertical constant is equal to "−0.6", the fifth vertical constant is equal to "1", and the sixth vertical constant is equal to zero.

15. A device for assisted piloting of an aircraft having a rotary wing and a propulsion unit having at least one propulsion propeller, each propeller having a plurality of first blades and the rotary wing having a rotor having a plurality of second blades, the device comprising:

control means suitable for being controlled by a pilot to deliver a movement order for movement in a direction;

a processor unit connected to the control means, the processor unit executing instructions to transform said order into an acceleration setpoint in said direction, and then to transform said acceleration setpoint, by predetermined relationships, into a required longitudinal attitude setpoint (θ*) and into a first required load factor setpoint (Nx*) in a longitudinal direction of the aircraft parallel to a roll axis of said aircraft;

a first automatic system for maintaining longitudinal attitude by controlling a longitudinal cyclic pitch of the second blades of the rotary wing in order to comply with the required longitudinal attitude setpoint (θ*); and a second automatic system for maintaining load factor by controlling a collective pitch of the first blades of the propulsion unit in order to comply with said first load factor setpoint (Nx*).

16. The device according to claim 15, including a third automatic system for maintaining load factor to control the collective pitch of said second blades, said processor unit transmitting a second required load factor setpoint to the third automatic means for maintaining load factor.

17. The device according to claim 16, including a system for determining flight parameters.

18. A hybrid aircraft including a device according to claim 15.

* * * * *